N. WATERMAN.
Coffee Boiler.
No. 39,851.  Patented Sept. 8, 1863.
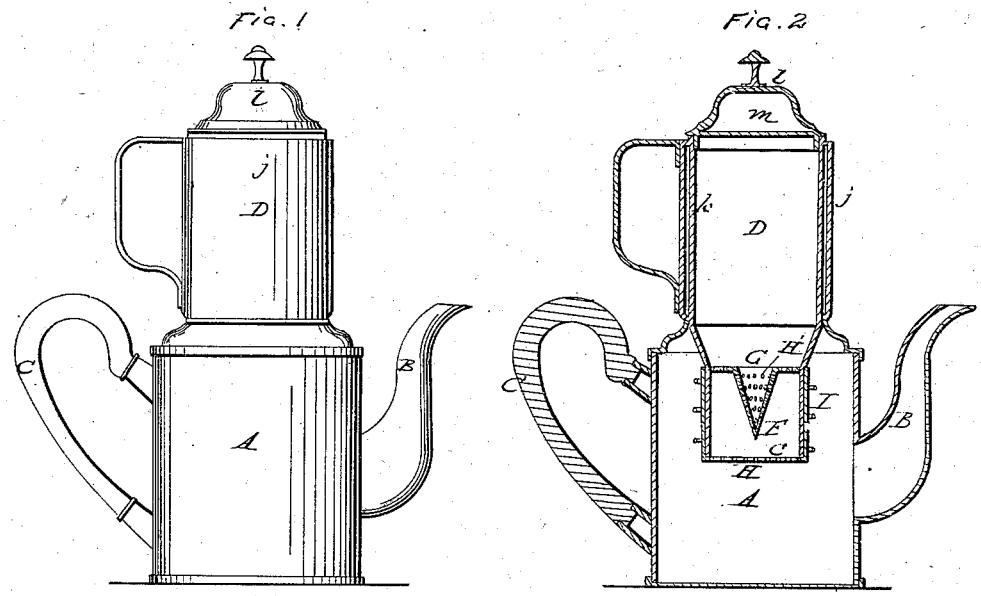
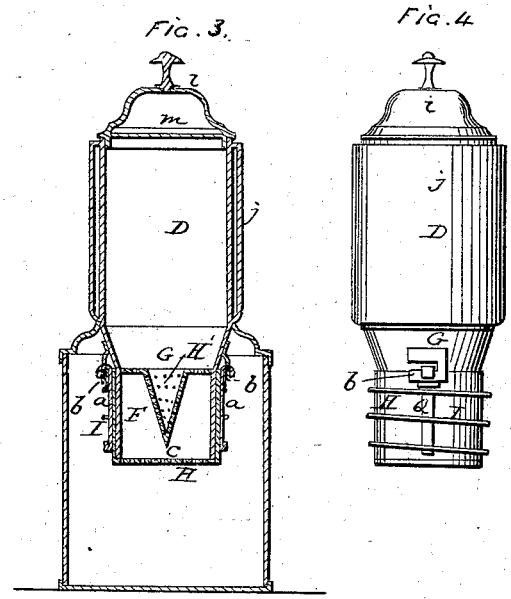
Attest.
Frederick Curtis
F. P. Hale Jr.
Inventor.
Nathaniel Waterman

UNITED STATES PATENT OFFICE.

NATHANIEL WATERMAN, OF BOSTON, MASSACHUSETTS.

IMPROVEMENT IN COFFEE-BOILERS.

Specification forming part of Letters Patent No. 39,851, dated September 8, 1863.

*To all whom it may concern:*

Be it known that I, NATHANIEL WATERMAN, a resident of Boston, in the county of Suffolk and State of Massachusetts, have made a new and useful invention having reference to apparatus for making decoctions of coffee; and I do hereby declare the same to be fully described in the following specification, and represented in the accompanying drawings, of which—

Figure 1 is an elevation, Fig. 2 a vertical and longitudinal section, and Fig. 3 a transverse section, of an apparatus provided with my invention. Fig. 4 is an internal view of the hot-water receiver and coffee-holder as they appear when separated or removed from the reservoir or pot which receives the decoction.

The nature of my invention consists in an improved coffee-decoction apparatus, as made with a perforated cone or its equivalent, arranged and combined with the hot-water reservoir and the coffee holder or box, or the same and its spring-expander, substantially as hereinafter described; also, in an arrangement and combination of a helical spring and one or more sliding latches and their catches together and with the water-vessel and the expander, the whole being substantially in manner and so as to operate as hereinafter specified.

In the drawings above mentioned, A represents the pot or vessel for the reception of the extract or decoction of coffee, the said pot being furnished with a handle, C, and an emptying-spout, B. D is the hot-water vessel or reservoir, which is placed above the vessel A, and fitted thereto, as seen in Figs. 2 and 3. F is the coffee holder or box for containing the ground coffee, the said coffee-holder being arranged within the vessel A and affixed to the bottom G of the vessel D, such bottom being foraminous and provided with a foraminous hollow cone, H', which extends downward from it, as shown in Figs. 2 and 3, the object of the cone being to admit the hot water directly into the body of the mass of coffee, and to cause such water to flow laterally as well as downward through the mass. It is found that with the foraminous cone the decoction of the coffee is produced more rapidly and to much better advantage than without it. The box or coffee-holder F is open at bottom, and extends within another box, H, which slides freely on it, and is enveloped by a helical spring, I, whose upper end is fastened to the box H. The lower coil of the spring I is connected with the lower ends of two sliding latches, *a a*, which are arranged on opposite sides of the expander or box H, and applied thereto so as to be capable of sliding freely up and down thereon. The upper end of each of the latches is hooked or otherwise made so as to take upon one of two hooks or catches, *b b*, extending down from the side of the water-vessel D. The latches and their catches constitute a "bayonet-connection" for applying the spring-expander to the coffee-box. By means of the arrangement and application of the spring I, the latches *a a*, and their catches, the box H will be free to move downward on the coffee-holder F under the pressure created by the expansion of the coffee. Instead of there being two latches to the spring, there may be but one. So, instead of there being but one spring to the two latches, each may have a separate spring. I would also remark that the water-vessel D is provided with an encompassing-jacket, *j*, so arranged as to form an air-space, *k*, around the said vessel. The cover *l* of the vessel is also provided with an air-space, *m*, the said air-spaces being to prevent the escape of heat. The box F, having been charged with ground coffee to the extent required, the spring expander or box H is to be put and fixed in place thereon. This having been accomplished, the whole is to be applied to the pot or vessel A, and the vessel D is to be charged with boiling or very hot water, which will descend into and through the mass of coffee and escape from the expander through its bottom *c*, which should be foraminous or be perforated with numerous small holes. The coffee in the box F, being saturated with water, will expand or swell very much, and by its action against the spring-expander will cause the latter to move downward and present such a resistance as will preserve the mass at its proper density—that is, one which, while permitting the water to pass through the coffee with the velocity necessary to effect the extraction from it of what may be desirable, will so confine the finer particles of the mass as to prevent them in a very great measure, if not entirely, from being carried through the mass and settling upon and clogging the strainer, or being diffused within the vessel A.

In my Patent No. 7,129, dated February 26, 1850, I have represented and claimed the spring-expander, in combination with the coffee box or receptacle. The arrangement and application of the spring thereof were very different in respect to the expander from those in my present coffee decoction apparatus.

What I now claim is—

1. The improved coffee-decoction apparatus, as made with the foraminous cone H', or its equivalent, arranged and combined with the hot-water receiver D, the coffee-holder F, or the same and its spring-expander, substantially as specified.

2. The arrangement and combination of the helical spring, the sliding latch or latches, and the catch or catches thereof, together and with the expander and water-vessel, the same being substantially as specified.

NATHL. WATERMAN.

Witnesses:
R. H. EDDY,
F. P. HALE, Jr.